(12) United States Patent
Magi et al.

(10) Patent No.: US 11,132,048 B2
(45) Date of Patent: Sep. 28, 2021

(54) USER ATTENTION-BASED USER EXPERIENCE

(71) Applicant: Intel Corporation, Santa Clara, CA (US)

(72) Inventors: Aleksander Magi, Portland, OR (US); Kathy Bui, Hillsboro, OR (US); Paul Diefenbaugh, Portland, OR (US); Marko Bartscherer, Chula Vista, CA (US)

(73) Assignee: Intel Corporation, Santa Clara, CA (US)

( * ) Notice: Subject to any disclaimer, the term of this patent is extended or adjusted under 35 U.S.C. 154(b) by 13 days.

(21) Appl. No.: 16/728,746

(22) Filed: Dec. 27, 2019

(65) Prior Publication Data

US 2020/0133382 A1 Apr. 30, 2020

(51) Int. Cl.
*G06F 3/01* (2006.01)
*G06F 1/32* (2019.01)
*G06F 1/3287* (2019.01)
*G06F 1/3231* (2019.01)
*G06F 1/16* (2006.01)

(52) U.S. Cl.
CPC .......... *G06F 1/3287* (2013.01); *G06F 1/3231* (2013.01); *G06F 3/013* (2013.01); *G06F 3/017* (2013.01)

(58) Field of Classification Search
CPC ...... G06F 1/3287; G06F 1/3231; G06F 3/017; G06F 3/013; G06F 3/012; G06F 1/325; G06F 1/1688; G06F 1/3278; G06F 1/1686; Y02D 10/00
USPC .......................................... 713/300, 320, 323
See application file for complete search history.

(56) References Cited

U.S. PATENT DOCUMENTS

| | | | |
|---|---|---|---|
| 8,913,004 B1 * | 12/2014 | Bozarth ................. | G09G 5/006 345/156 |
| 2018/0052519 A1 * | 2/2018 | Amores-Llopis ....... | G06F 3/011 |
| 2018/0113868 A1 * | 4/2018 | Liu ................... | G06F 16/24578 |

* cited by examiner

*Primary Examiner* — Michael J Brown
(74) *Attorney, Agent, or Firm* — Schwegman Lundberg & Woessner, P.A.

(57) ABSTRACT

Various systems and methods for adapting a computer based on user attentiveness are described herein. A system for attention-based gesture recognition includes processing circuitry to: access an image of a user, the user proximate to a computing device; determine, based on the image, whether user is attentive to the computing device; and selectively enable or disable a function of the computing device depending on whether the user is attentive.

18 Claims, 7 Drawing Sheets

USER ATTENTION-BASED USER EXPERIENCE

TECHNICAL FIELD

Embodiments described herein generally relate to visual tracking systems and in particular, to a system that performs operations conditionally based on user-attentiveness.

BACKGROUND

Power savings are more important with the increased use of mobile devices and battery-powered systems. Laptops, tablets, mobile phones, and even electric vehicles are being designed with power savings in mind. Designs have to balance efficient use of battery power with desired user experience.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
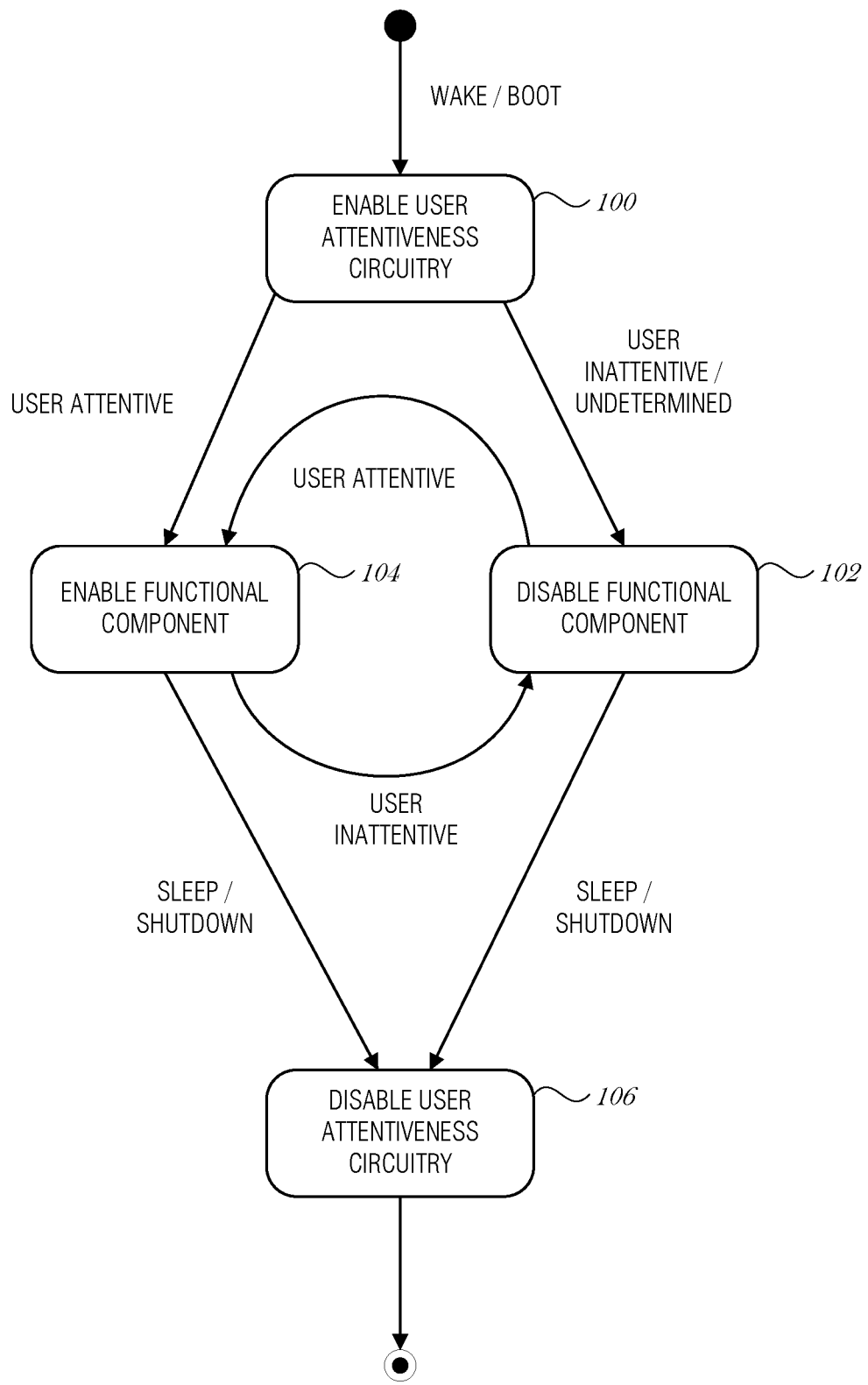
FIG. 1 is a state diagram illustrating the general operation of the system, according to an embodiment.

Systems and methods described herein provide a system that selectively performs operations when the user is determined to be paying attention to the system. In various examples, the systems and methods described herein optimize system performance and user interaction fidelity by using user attentiveness to selectively perform operations. User attentiveness may be determined by head or body posture, eye gaze, or eye tracking, used independently or in combination. If the user is not attentive, then the system may reduce power or reduce processing resources. For instance, a system-on-chip (SOC) may power down circuitry that is used for gesture detection, audio output, or audio input, when the user is determined to be inattentive. When the user is deemed to be attentive, then the corresponding circuitry may be powered up (or provided other resources). In newer low-power systems, efficient use of battery power is important. By powering off subsystems or placing them into low-power mode (e.g., sleep or suspend), battery life may be extended.

Example subsystems include, but are not limited to, subsystems that provide audio input or output or subsystems that are used to detect user input gestures. For instance, to improve the user experience and performance of systems that are controlled by gesture, the system tracks the user's attention and determines if the user is actively engaging with the system (e.g., giving attention to the system) before activating gesture detection circuitry to detect actions that may be performed by the user. By doing so, the system is able to reduce or eliminate power wasted on gesture detection when the user is not intending for the system to react to non-input-oriented movements. As a result, the systems and methods described herein improve power management by reducing or eliminating processor utilization that may be used to detect and classify unintentional movements. The systems and methods described herein also reduce unintentional user interface interactions, which directly increase user satisfaction when using the system.

In an audio input scenario, a microphone may be directionally controlled to better capture aural utterances by the user. When the user is determined to be inattentive (e.g., looking away from the monitor), then the microphone circuitry may be powered down or set to a low-power state to conserve energy. Similarly, in an audio output scenario, beamforming techniques may be used to control speakers and adjust the soundstage of the output audio to orient on the user. If the user is determined to be inattentive, then the output audio may be disabled or reduced in power (e.g., lower volume).

What is needed is a system that monitors user attentiveness and selectively enables subcomponents based on attentiveness. By selectively enabling and disabling subcomponents, the system provides better battery and power management and increases user experience. Subcomponents may include, but are not limited to, gesture detection circuitry, audio input circuitry (e.g., microphones and associated circuitry), or audio output circuitry (e.g., speakers and associated circuitry).

FIG. 1 is a state diagram illustrating the general operation of the system, according to an embodiment. In an initial state, the system may be power on, woken from sleep, or otherwise activated. For instance, the system may be a laptop computer and the system may wake from a low-power mode when the screen is opened from the base portion. As another example, the system may be a mobile phone and the system may wake from a suspended state when an accelerometer senses a threshold amount of motion. Other initial states may be experienced by the system and the provided list is not exhaustive.

Once active, the system enters state 100, where user attentiveness circuitry is enabled. User attentiveness circuitry may include several components in the system, such as a camera, image analysis circuitry, an intellectual property (IP) block in a processor or system-on-chip (SOC), processing circuitry, machine-learning circuitry, or the like. User attentiveness circuitry is configured, programmed, or otherwise designed and produced to analyze input data (e.g., an image or video) and determine whether a person represented by the input data is attentive. Attentiveness may be determined using statistical analysis, such as an amount of time with eyes focused on the screen of the system, a head position that is generally pointed toward the system, a body position indicating alertness or attentiveness (e.g., erect and moving versus prone and still), breathing patterns, or other indications.

When the user is determined to be inattentive or when it is undetermined whether the user is attentive (e.g., immediately after system activation), then one or more functional components are disabled (state 102). Functional components may include audio components, such as a microphone or speaker, each with associated circuitry, or other functional components, such as a gesture detection circuit. Disabling these components reduces power draw and may also reduce false gesture detections. Additionally, disabling components may reduce or eliminate false inputs—those that are not intended to be input. For instance, when a user waves their hand while not looking at the computer system, the user is likely not trying to issue a gesture-based command to the system. In such an instance, the false input is correctly ignored. This increases the user experience by reducing or eliminating unpredictable or illogical system behavior.

When the user is determined to be attentive, one or more functional components are enabled (state 104). As the user transitions between being attentive and inattentive, the functional components are enabled or disabled accordingly. Upon a sleep, shutdown, or other termination of a user session, the user attentiveness circuity is suspended, shutdown, placed in a low-power mode, or otherwise disabled (state 106).

Figure 2:
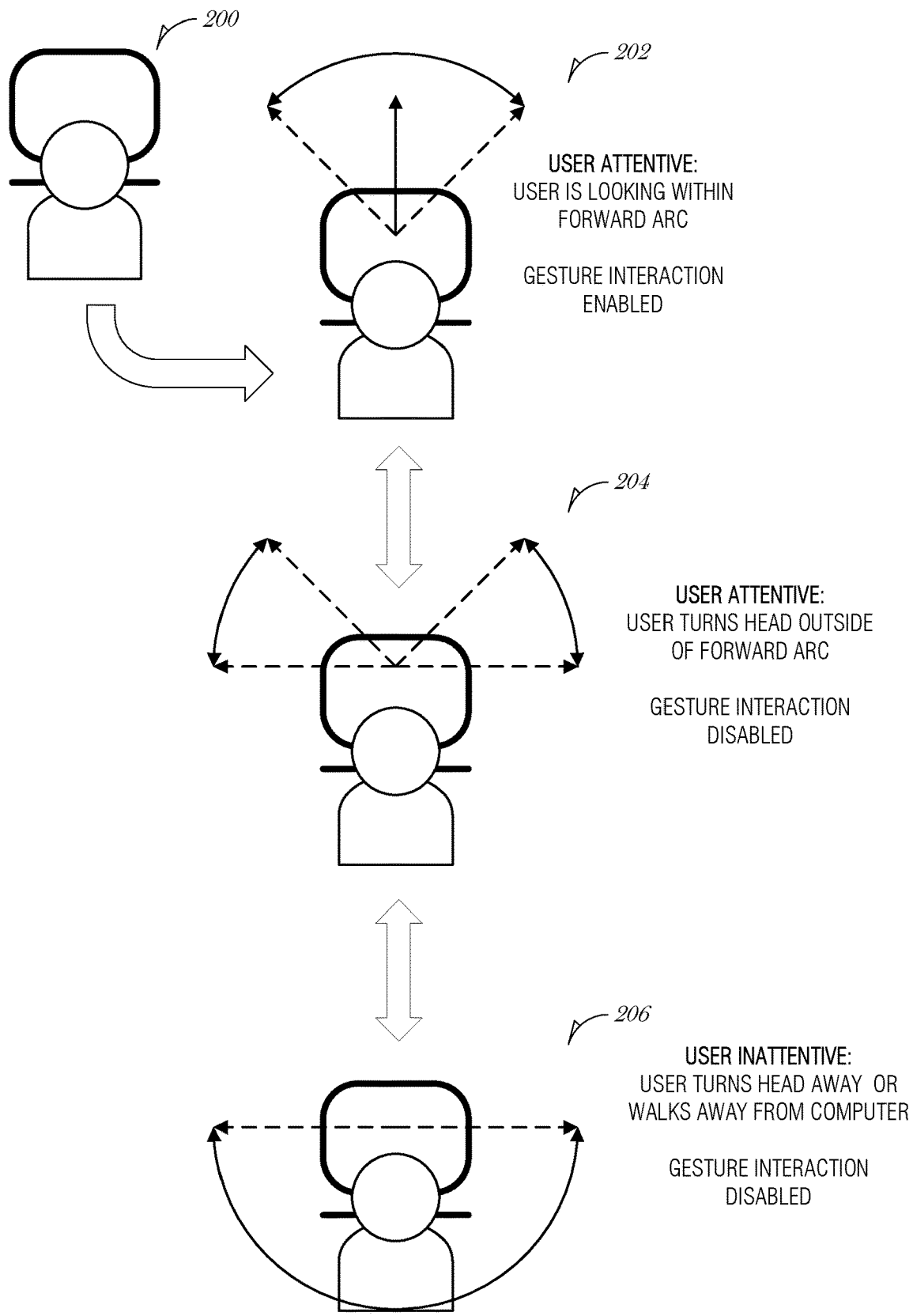
FIG. 2 is a diagram illustrating control flow of a system according to an embodiment.

FIG. 2 is a diagram illustrating control flow of a system according to an embodiment. A user is detected as sitting in front of an operating computer (state 200). The computer may be of any type including but not limited to a laptop, hybrid computer, tablet, gaming system, phablet, smartphone, television, in-vehicle infotainment system, vending machine, kiosk, in-store digital signage, or other compute device having one or more screens.

The user may be detecting by way of various mechanisms, such as a user-facing camera, infrared motion detection, or other proximity detection system. The user's head pose, or gaze is determined and depending on the direction or orientation, control is transitioned to one of three states.

Attentiveness may be tracked using head pose or position, eye tracking, body pose or position, or a combination of such feature tracking. Head position may be tracked using shape models, which are fit to the face in an image and used to derive a head pose from the model's parameters. Head position may also be estimated based on a statistical approach. With one or more images of the user, the images are compared to known poses using statistical analysis to determine a likely pose. Other methods, such as geometrical approaches may be used to estimate a head pose position based on a location or geometrical orientation of facial features (e.g., eyes, nose, mouth).

A user-facing camera array may be used to track eye movement and determine directionality of eye gaze. Gaze detection may be performed using a non-contact, optical method to determine eye motion. Infrared light may be reflected from the user's eye and sensed by an inward-facing video camera or some other optical sensor. The information is then analyzed to extract eye rotation based on the changes in the reflections from the user's retina. Another implementation may use video to track eye movement by analyzing a corneal reflection (e.g., the first Purkinje image) and the center of the pupil. Use of multiple Purkinje reflections may be used as a more sensitive eye tracking method. Other tracking methods may also be used, such as tracking retinal blood vessels, infrared tracking, or near-infrared tracking techniques. A user may calibrate the user's eye positions before actual use to set the central gaze or threshold gaze angles, for example.

Gestures may include finger, hand, arm, face, head, shoulder, or other bodily gestures. The computer, or an auxiliary system that works with the computer, may be trained or configured to recognize gestures. Such training may be based on machine-learning techniques.

Returning to the diagram in FIG. 2, if the user is generally looking at or oriented to the computer, i.e., attentive, then control is transitioned to state 202. A threshold angle may be used to determine when the user is generally looking at or oriented to the computer. The angle may be +/−45°, +/−30°, or some other angle where when the user's head is oriented to be within the arc created by the angles that the user is generally considered to be paying attention to the computer. The threshold angle of forward viewing may be configurable, such as by the user or an administrator. The threshold angle to the user's right side may be different than the threshold angle to the user's left side. For instance, the range may be −30° to +45° from directly forward (0°).

In state 202, gesture interaction is enabled. Thus, when a user performs a gesture, then gesture detection circuitry is implemented to detect the gesture, recognize it, identify it, classify it, or otherwise manage the gesture. Additional software, circuitry, hardware, or combinations thereof, may be used to respond to the gesture in the case when the gesture is used as user input to control the computer.

If the user turns their head past the threshold forward angle (e.g., turns their head left past 45° from center, then control is transitioned to state 204. In state 204, gesture interactions are disabled. By disabling the gesture interactions, circuitry that is used to detect and recognize gestures may be disabled or placed in a lower-power mode to conserve energy. If later the user turns their head back to within the threshold forward angle, then control is transitioned to state 202 and gesture interactions are re-enabled.

If the user turns their head past a second threshold angle, such as +/−90°, such that the user is substantially looking away from the computer, then control is transitioned to state 206 and the gesture interaction is disabled. Similarly, if the user walks away from the computer, then the gesture interactions are disabled. The control may transition between states 202, 204, or 206, during a user's session with the computer.

Note that attentiveness tracking for head or body pose is performed primarily on the x-y plane (e.g., horizontal plane). However, attentiveness may be tracked in the z-plane as well so that when a user is looking up or down more than some threshold angle in the vertical axis, the user may be considered as being inattentive and the gesture interactions may be disabled. In an embodiment, the vertical angle thresholds are +/−30°, although it is understood that any threshold angle may be used and that such angle may be configured by a user or administrator. Further, the vertical threshold angles may differ such that a head pose with higher than a positive 30° or lower than a negative 20° head tilt is considered inattentive.

Figure 3:
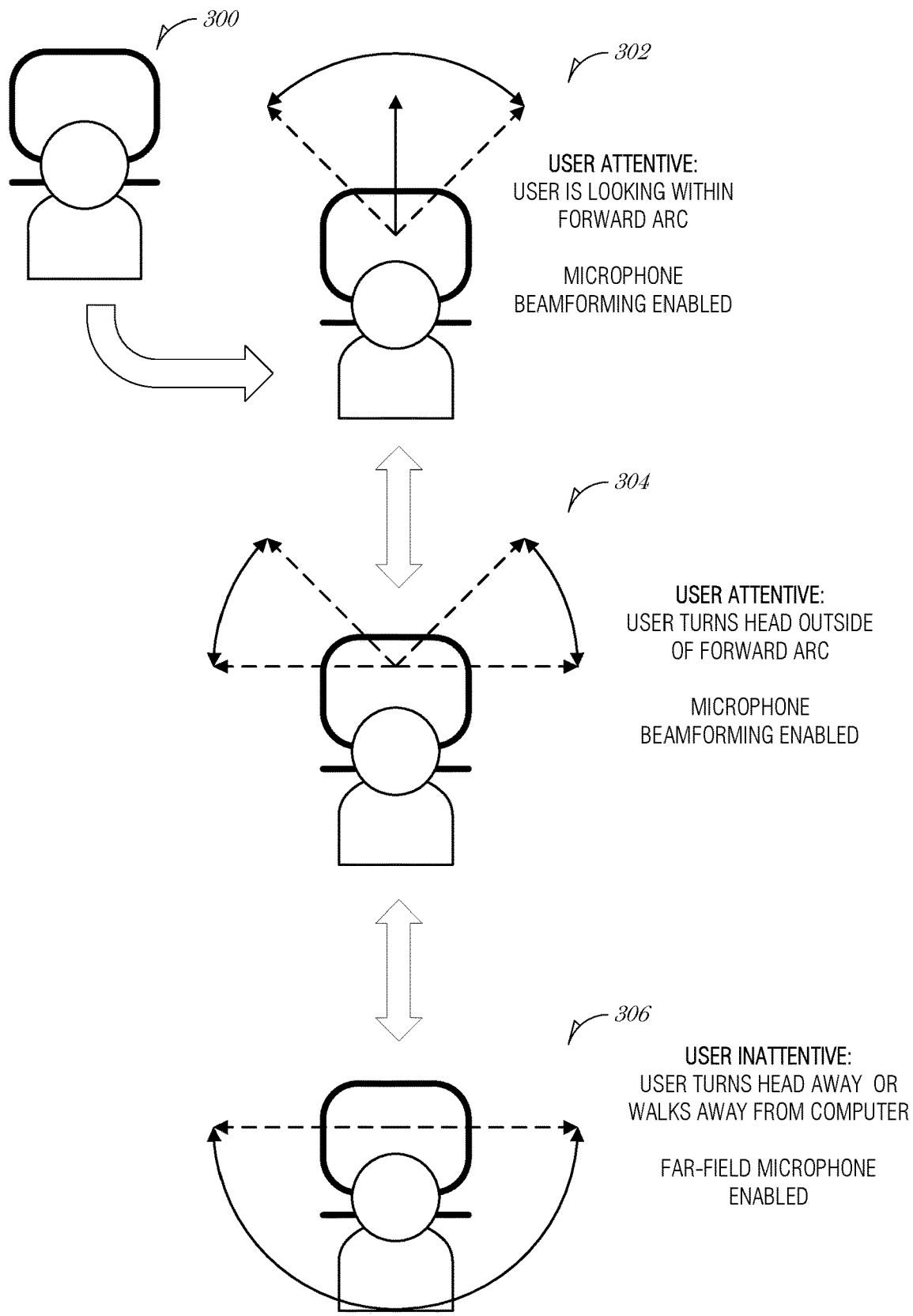
FIG. 3 is a diagram illustrating control flow of a system according to an embodiment.

FIG. 3 is a diagram illustrating control flow of a system according to an embodiment. In the control flow of FIG. 3, the system adaptively adjusts microphone sensitivity based on the user's head pose. This adaptive adjustment increases audio clarity and thereby increases the user experience for the instant user and other users (e.g., those listening to the audio at the receiving end of a conversation).

A user is detected as sitting in front of an operating computer (state 300). The computer may be of any type including but not limited to a laptop, hybrid computer, tablet, gaming system, phablet, smartphone, television, in-vehicle infotainment system, vending machine, kiosk, in-store digital signage, or other compute device having one or more screens. The user may be detecting by way of various mechanisms, such as a user-facing camera, infrared motion detection, or other proximity detection system. The user's head pose, or gaze is determined and depending on the direction or orientation, control is transitioned to one of three states.

If the user is attentive, as determined by detecting that the user is generally looking forward or has a head pose that is generally directed to the computer, then control is transitioned to state 302. In state 302, microphone beamforming is used to localize the audio input. Multiple microphones may be configured in an array to form a directional response or a beam pattern. A beamforming microphone array may be designed to be more sensitive to sound coming from one direction than from other directions. Microphone signals may be fed to a digital signal processor (DSP) mixer, which may introduce delay to microphone signals to electronically steer the beam pattern without physically moving the microphone array. Signals from a particular direction may be aligned and then summed by the DSP mixer to steer the main lobe direction. This enhances the signal from the target wavefront and deemphasizes the noise or interference wavefront. Other mechanisms may be used to steer microphone beam patterns.

If the user moves their head past a first threshold angle, then the control transitions to state 304. Microphone beamforming is used to capture better input from an indirect angle. The user may move their head back and forth while talking, in which case the beamforming may follow the users approximate head pose and position. The first threshold angle may be +/−45°, +/−30°, or some other angle where when the user's head is oriented to be within the arc created by the angles that the user is generally considered to be paying attention to the computer. The first threshold angle to the user's right side may be different than the first threshold angle to the user's left side.

If the user moves their head past a second threshold angle, control is transitioned to state 306 and the microphone array is adapted to use a far field configuration. A far-field microphone is used to capture sounds for a greater distance than near-field microphones. Far-field microphones use specific algorithms to amplify speech and reduce noise from other sources so that voice commands or other spoken input is discernable over background noise.

As the user moves their head to face to or away from the computer, control is transitioned through the various states 302, 304, and 306, the microphone is adapted.

Figure 4:
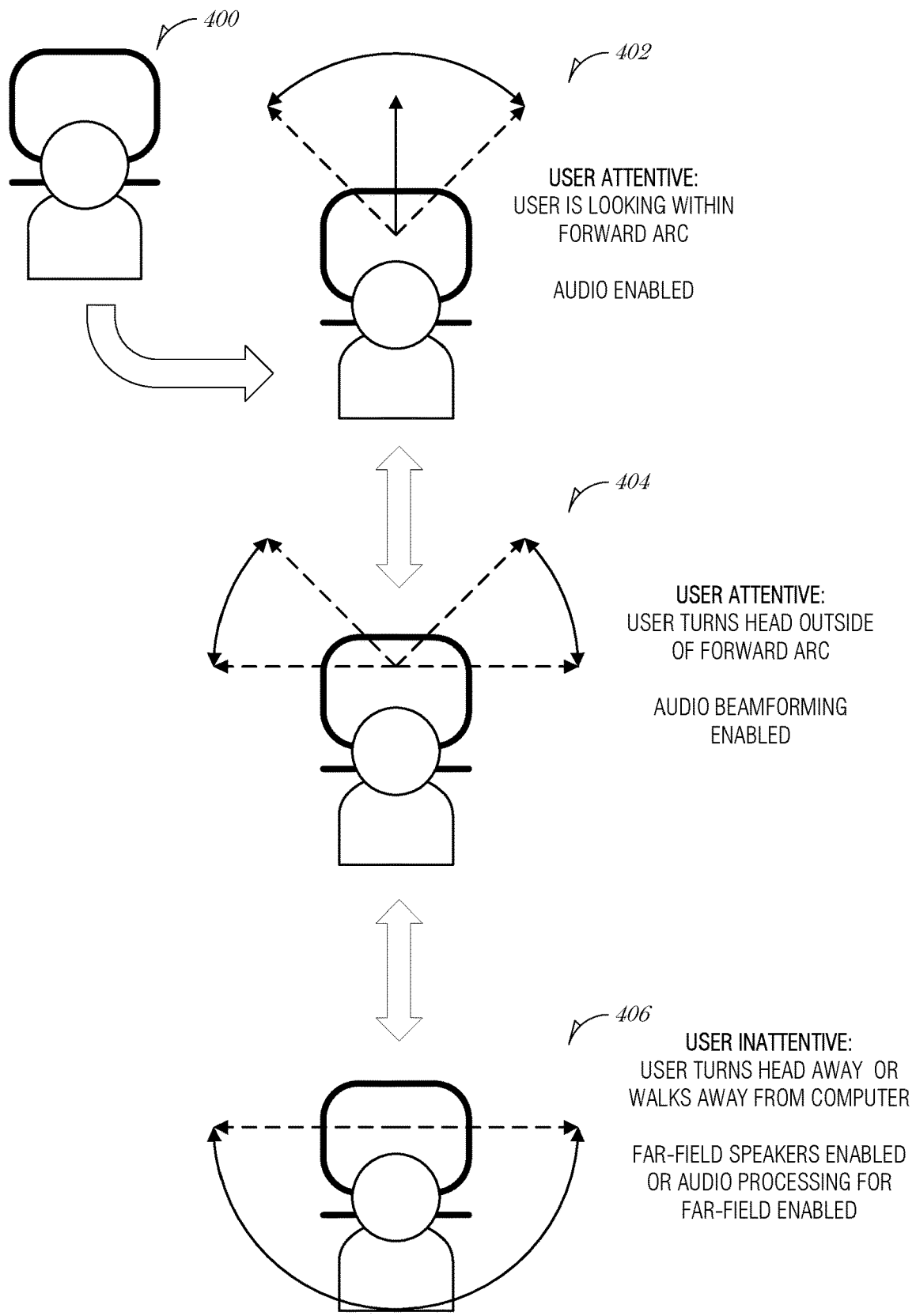
FIG. 4 is a is a diagram illustrating control flow of a system according to an embodiment.

FIG. 4 is a is a diagram illustrating control flow of a system according to an embodiment. In the control flow of FIG. 4, the system adaptively adjusts speaker directionality based on the user's head pose. This adaptive adjustment increases audio clarity and thereby increases the user experience for the listening user.

A user is detected as sitting in front of an operating computer (state 400). The computer may be of any type including but not limited to a laptop, hybrid computer, tablet, gaming system, phablet, smartphone, television, in-vehicle infotainment system, vending machine, kiosk, in-store digital signage, or other compute device having one or more screens. The user may be detecting by way of various mechanisms, such as a user-facing camera, infrared motion detection, or other proximity detection system. The user's head pose, or gaze is determined and depending on the direction or orientation, control is transitioned to one of three states.

If the user is attentive, as determined by detecting that the user is generally looking forward or has a head pose that is generally directed to the computer, then control is transitioned to state 402. In state 402, audio beamforming is used to localize the audio output.

If the user moves their head past a first threshold angle, then the control transitions to state 404. Audio beamforming is used to provide better sound reproduction to the user. The first threshold angle may be +/−45°, +/−30°, or some other angle where when the user's head is oriented to be within the arc created by the angles that the user is generally considered to be paying attention to the computer. The first threshold angle to the user's right side may be different than the first threshold angle to the user's left side. In state 404, near-field acoustic processing may be used to provide a better sound stage (e.g., that of a larger far-field broad sound stage).

If the user moves their head past a second threshold angle, control is transitioned to state 406 and the speakers are adapted to use a far field configuration. Far-field processing is used to produce sounds for a person who is relatively far away from the audio source. Adjusting the dynamic range, crossover frequency, mixing levels, or other processing techniques, the speakers may be altered to produce a far field when the user is facing away from the computer or has walked away. Far-field speakers typically have lower dynamic range, larger drivers, and larger frequency range. Using a far-field speaker for close up listening may not produce an optimal sound stage. As such, a set of far-field speakers may be enabled and used in place of near-field speakers, when the control is transitioned to state 406.

As the user moves their head to face to or away from the computer, control is transitioned through the various states 402, 404, and 406, the sound output is processed differently, or the speakers are reconfigured. For instance, speakers may be enabled or disabled based on the angle, position, or configuration of the sound stage desired for the user in the states 402, 404, and 406.

Figure 5:
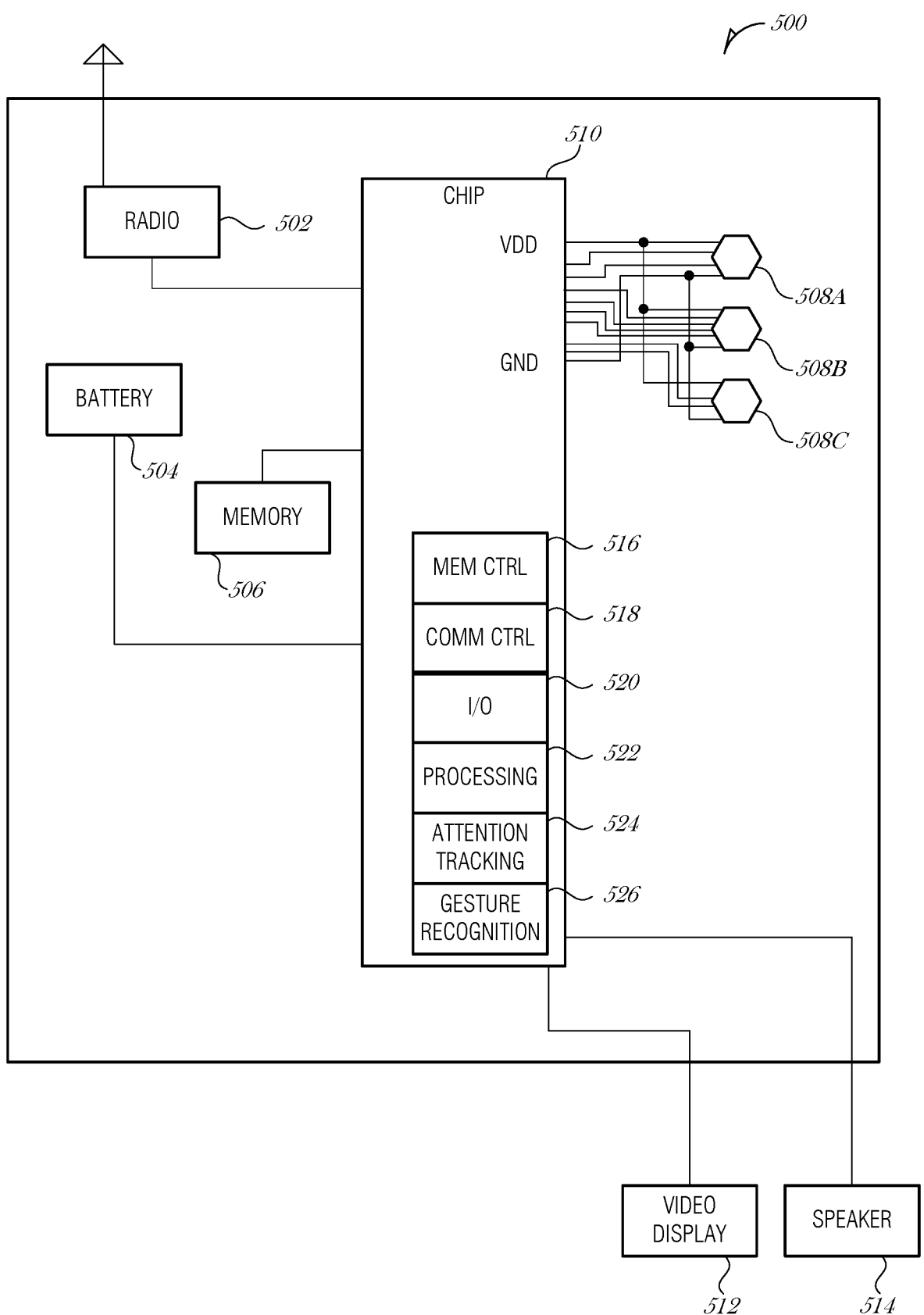
FIG. 5 is a block diagram illustrating a system, according to an embodiment.

FIG. 5 is a block diagram illustrating a system 500, according to an embodiment. The system 500 may represent a computer device or be one or more components of a computer device. Computer devices include, but are not limited to a laptop, hybrid computer, tablet, gaming system, phablet, smartphone, television, in-vehicle infotainment system, vending machine, kiosk, in-store digital signage, or other compute device having one or more screens.

The system 500 includes various components, some or all of which may be on the same printed circuit board. Components include, but are not limited to, a radio 502, battery 504, memory 506, and sensors 508A-C, which are coupled to a chip 510. Sensors 508A-C may include microphones, cameras, capacitive touch panels, or the like. The components may further be coupled to a video display 512 or speaker array 514.

Radio 502 may be configured to provide a wireless networking communication system. The wireless networking communication system may use one or more of a variety of protocols or technologies, including Wi-Fi, 3G, and 4G LTE/LTE-A, WiMAX networks, Bluetooth, near field communication (NFC), or the like.

Battery 504 may be a rechargeable battery type, (e.g., nickel-cadmium (NiCad), lead-acid, lithium ion (Li-ion), or other suitable technologies) or a non-rechargeable battery type (e.g., primary battery). Battery 504 may be used to provide power to various components of the system 500.

Memory 506 may be volatile memory (e.g., dynamic random access memory—DRAM) or non-volatile memory, such as flash memory (e.g., electrically-erasable read-only memory—EEPROM, NAND Flash, NOR Flash, etc.). Memory 506 may be used to store instructions to perform the various operations described herein. Memory 506 may also be used to store sensor data obtained by sensors 508A-C, pose data, eye tracking data, gesture data, images, and other data to provide the functions described herein.

The one or more sensors 508A-C, which may include, but are not limited to a microphone array, camera system, LIDAR, radar, an ultrasonic detector, an infrared detector, a motion detector, and the like. The chip 510 provides an external supply voltage (Vdd) to each of the sensors 508A-C. Various digital or analog signals may be received by the chip 510 from each of the sensors 508A-C. Sensor data may be read as raw data from the line or by using a communication protocol to package sensor data into a data structure. Sensors 508A-C may alternatively obtain power from other circuitry or power pathways than through chip 510. The camera system may be integrated with or a part of sensors 508A-C.

In an embodiment, the camera system is mounted on a bezel of a laptop lid, such that when the laptop is open and is being used by a user, the camera is operable to capture the user's body position, head pose, hand gestures, or other information. In an embodiment, the camera system is incorporated into an autonomous vehicle and may be mounted on a windshield of the autonomous vehicle and positioned to capture face and body position information of the operator of the autonomous vehicle.

The chip 510 may include one or more microprocessors, digital signal processors, etc. Chip 510 may contain one or more processing cores, each of which has one or more arithmetic logic units (ALU), instruction fetch unit, instruction decode unit, control unit, registers, data stack pointer, program counter, and other essential components according to the particular architecture of the processor. As an illustrative example, chip 510 may be a system on chip (SOC) that includes multiple intellectual property (IP) blocks or IP cores. Chip 510 may include an x86-type of processor, which may be implemented as one of the IP blocks. Chip 510 may also include a graphics processing unit (GPU). Again, this may be implemented as an IP block. GPU may be a specialized co-processor that offloads certain computationally-intensive operations, particularly those associated with graphics rendering. GPU may be a separate integrated circuit, in which case chip 510 and GPU generally work collaboratively, sharing access to memory resources, I/O channels, etc. (e.g., in an SOC).

The system 500 is understood to encompass tangible entities that are physically constructed, specifically configured (e.g., hardwired), or temporarily (e.g., transitorily) configured (e.g., programmed) to operate in a specified manner or to perform part or all of any operations described herein. Such tangible entitles may be constructed using one or more circuits, such as with dedicated hardware (e.g., field programmable gate arrays (FPGAs), logic gates, graphics processing unit (GPU), a digital signal processor (DSP), etc.). As such, the tangible entities described herein may be referred to as circuits, circuitry, processor units, subsystems, or the like.

As discussed, the chip 510 may have several intellectual property (IP) blocks. IP blocks may be independent processing circuitry or reusable logic for a designated purpose. The chip 510 is able to selectively provide power to an IP block depending configuration data, state data, or other control signals.

Some examples of IP blocks include but are not limited to a memory controller IP block 516, a communication IP block 518, an input/output IP block 520, a processing IP block 522, an attention tracking IP block 524, and a gesture recognition IP block 526. It is understood that many more IP blocks may be implemented in a chip. Further, it is understood that IP blocks may be referred to as processing circuitry or processing circuits. IP blocks may include memory, instructions, processors, comparators, adders, subtractors, transistors, and other digital circuit components to provide general processing support or specific application tasks, depending on the design of the IP block.

Memory controller IP block 516 is used to interface with memory devices that are on-chip or off-chip. Memory controller IP block 516 may interface with memory 506 to provide access to instructions or data used by processing IP block 522.

Communication IP block 518 is used to interface with devices over a network connection, such as with Ethernet, Wi-Fi, Bluetooth, or the like. Input/output IP block 520 is used to interface with storage devices connected to the system 500. For example, input/output IP block 520 may provide a host controller for Serial Advanced Technology Attachment (SATA) devices or Universal Serial Bus (USB) devices.

An attention tracking IP block 524 is used to interface with a camera and determine whether the user of the system 500 is attentive. The attention tracking IP block 524 may pause the camera when in low-power standby state (e.g., when the laptop is suspended or in sleep mode). The attention tracking IP block 524 may interface with other components of the system 500 to determine when the system 500 is woken from sleep or other meaningful event and transitions the camera from sleep mode to a low-power streaming mode. For instance, the attention tracking IP block 524 may interface with a lid position sensor system to detect when a laptop lid is opened. When the camera is operating in low-power streaming mode, the camera may capture images at a relatively low framerate (e.g., 3 frames per second). This reduces the amount of power necessary to operate the camera.

When the user is determined as being attentive (e.g., when the user is facing the laptop screen), the attention tracking IP block 524 may signal the gesture recognition IP block 526 to awake. When the user is not paying attention, the attention tracking IP block 524 may cause the gesture recognition IP block 526 to sleep, suspend, hibernate, or otherwise reduce or eliminate power consumption. This action provides power savings to the system 500.

The attention tracking IP block 524 may be configured to track a gaze of the user. In an embodiment, to track the gaze of the user, the attention tracking IP block 524 is to capture a representation of the user and analyze the representation to determine the gaze of the user. Various cameras may be used including, but not limited to optical cameras, infrared cameras, LIDAR, depth cameras, and the like. Thus, in a further embodiment, the representation is an optical image and the attention tracking IP block 524 is to analyze the representation using facial analysis to determine the gaze of the user. In another embodiment, the representation is a three-dimensional representation and the attention tracking IP block 524 is to analyze the representation with morphologic analysis to determine the gaze of the user based on the user's head or body pose. Morphologic analysis may be performed on a 3D representation of the user, for example.

When awake or active, the gesture recognition IP block 526 may analyze images of the user captured by the camera and identify or classify gestures performed by the user. The camera may be reconfigured to capture images at a higher framerate (e.g., 30 fps) instead of the lower framerate used when determining attentiveness. Alternatively, a separate camera may be used for gesture detection than for attentiveness tracking. When a separate camera is used for gesture detection, it may be powered off when the gesture recognition IP block is powered off.

Figure 6:
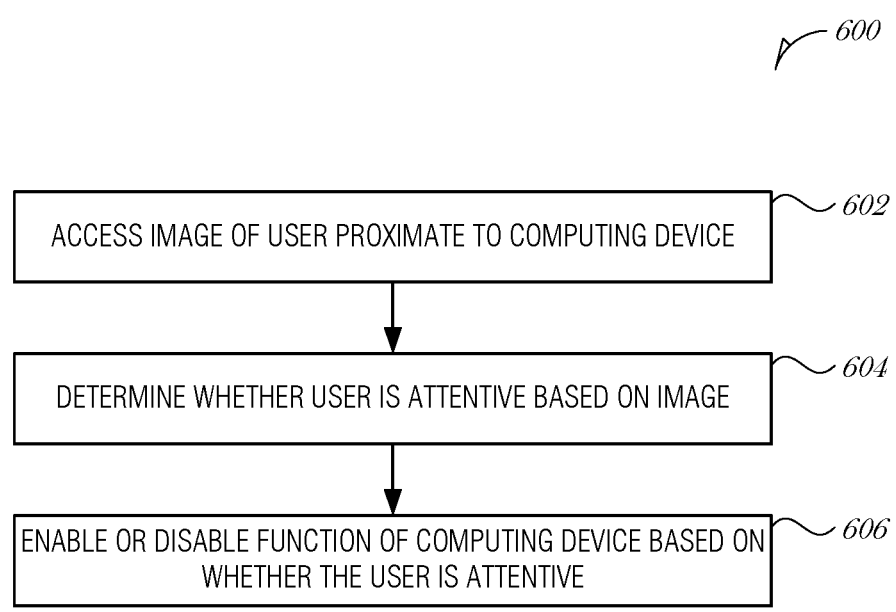
FIG. 6 is a flowchart illustrating a method of attention-based gesture recognition, according to an embodiment.

FIG. 6 is a flowchart illustrating a method 600 of attention-based gesture recognition, according to an embodiment. At block 602, an image of a user proximate to a computing device is accessed. The image may be captured by a camera mounted in a screen bezel of the computing device. The camera may be a low-power, low-framerate camera used for attention tracking.

At block 604, it is determined, based on the image, whether user is attentive to the computing device. In an embodiment, determining whether the user is attentive includes determining a head pose of the user from the image, determining a direction angle of the head pose with respect to the computing device, and determining that the user is attentive based on a first threshold angle and a second threshold angle, wherein the first threshold angle is measured in a first direction with respect to the computing device, and the second threshold angle is measured in a second direction with respect to the computing device, the second direction opposite of the first direction, and wherein the user is determined to be attentive if the direction angle is between the first threshold angle and the second threshold angle.

In an embodiment, determining whether the user is attentive includes determining a direction angle of eye gaze of the user, with respect to the computing device based on the image and determining that the user is attentive based on a first threshold angle and a second threshold angle. In such an embodiment, the first threshold angle is measured in a first direction with respect to the computing device, and the second threshold angle is measured in a second direction with respect to the computing device, the second direction opposite of the first direction. The user is determined to be attentive if the direction angle is between the first threshold angle and the second threshold angle.

For instance, the first threshold angle may be 45° off center to the left of the screen and the second threshold angle may be 30° off center to the right of the screen. In such an example, if the user's direction angle of eye gaze is between −45° and +30° with respect to the forward direction, then the user is considered as attentive.

In an embodiment, the first and second thresholds angles are approximately 45° from a centerline, the centerline defined by a ray from the user to the computing device.

In another embodiment, the first and second thresholds angles are different angles (e.g., 45° left and 60° to the right). Such an implementation is useful when the user has a second screen (e.g., multiple monitor setup) and the user is paying attention to the second screen, which may be positioned on the right side of the primary screen of the computing device. The user may configure the left or right threshold angles to accommodate a second, third, or more screens or other objects that are considered to be in an "arc of attentiveness" where the user's gestures, spoken input, or other attention-based control is used.

In an embodiment, the first and second thresholds angles positive and negative vertical angles measured from a horizon, the horizon defined by a horizontal plane including a centerline from the user to the computing device. For instance, the user may be looking up or down to another screen and should therefore be considered as being attentive to the computing device.

At block 606, a function of the computing device is selectively enabled or disabled depending on whether the user is attentive. In an embodiment, the function of the computing device includes gesture recognition. In such an embodiment, selectively enabling or disabling the function of the computing device depending on whether the user is attentive includes supplying power to a gesture recognition circuitry when the user is attentive and reducing power to the gesture recognition circuitry when the user is inattentive, the user considered inattentive when the direction angle of the head pose exceeds the first or second threshold angle.

In an embodiment, the function of the computing device includes audio processing. In such an embodiment, selectively enabling or disabling the function of the computing device depending on whether the user is attentive includes selectively configuring a microphone array to track voice commands of the user based on head position of the user.

In an embodiment, the function of the computing device includes sound output. In such an embodiment, selectively enabling or disabling the function of the computing device depending on whether the user is attentive includes selectively configuring a speaker array to provide an optimal soundstage based on head position of the user.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, such as modules, intellectual property (IP) blocks or cores, or mechanisms. Such logic or components may be hardware, software, or firmware communicatively coupled to one or more processors in order to carry out the operations described herein. Logic or components may be hardware modules (e.g., IP block), and as such may be considered tangible entities capable of performing specified operations and may be configured or arranged in a certain manner. In an example, circuits may be arranged (e.g., internally or with respect to external entities such as other circuits) in a specified manner as an IP block, IP core, system-on-chip (SOC), or the like.

In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hard-wired), or temporarily (e.g., transitorily) configured (e.g., programmed) to operate in a specified manner or to perform part or all of any operation described herein.

Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

An IP block (also referred to as an IP core) is a reusable unit of logic, cell, or integrated circuit. An IP block may be used as a part of a field programmable gate array (FPGA), application-specific integrated circuit (ASIC), programmable logic device (PLD), system on a chip (SOC), or the like. It may be configured for a particular purpose, such as digital signal processing or image processing. Example IP cores include central processing unit (CPU) cores, integrated graphics, security, input/output (I/O) control, system agent, graphics processing unit (GPU), artificial intelligence, neural processors, image processing unit, communication interfaces, memory controller, peripheral device control, platform controller hub, or the like.

Figure 7:
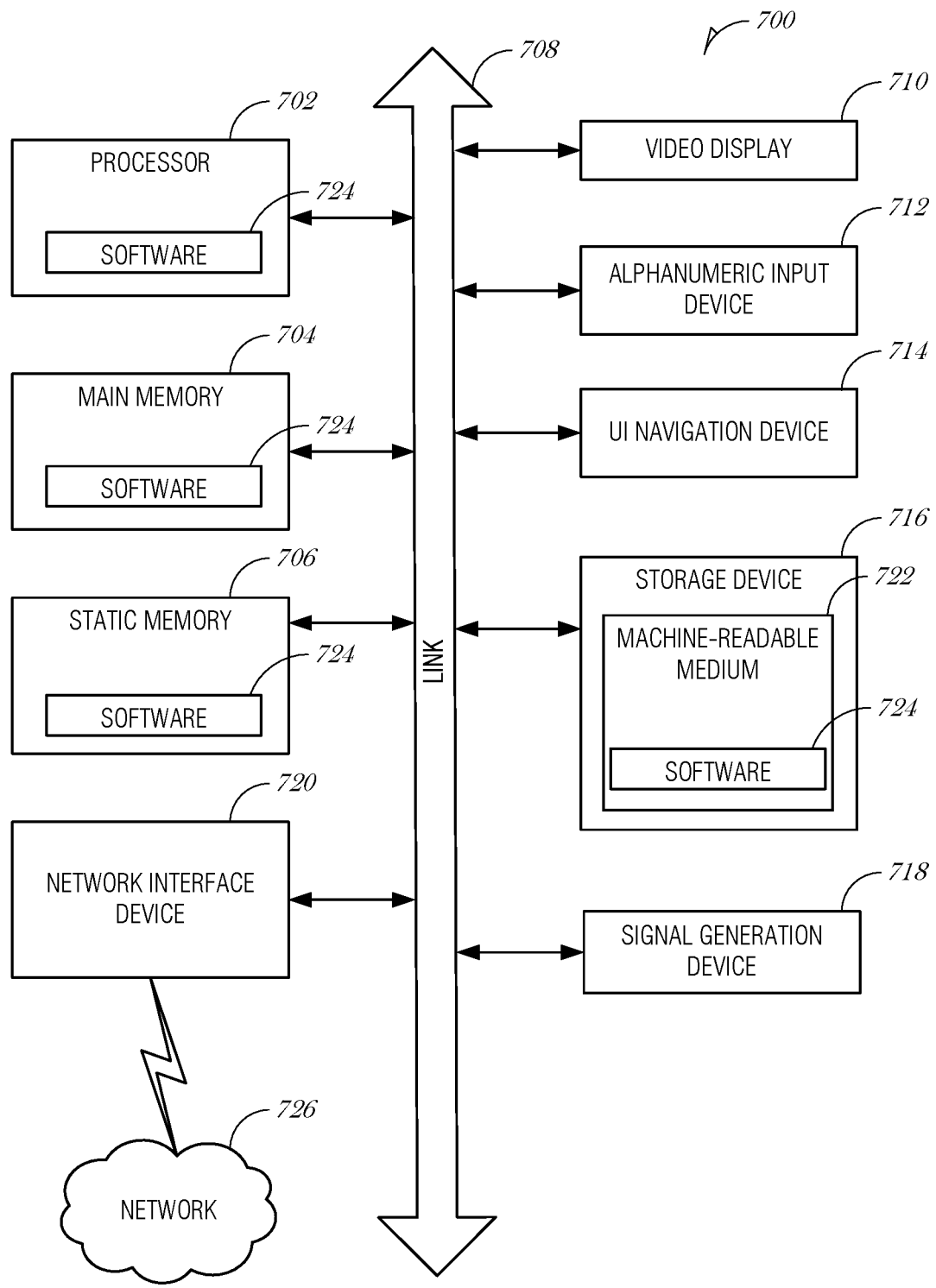
FIG. 7 is a block diagram illustrating an example machine upon which any one or more of the techniques (e.g., methodologies) discussed herein may perform, according to an example embodiment.

FIG. 7 is a block diagram illustrating a machine in the example form of a computer system 700, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 700 includes at least one processor 702 (e.g., a central processing unit (CPU), a graphics processing unit (GPU) or both, processor cores, compute nodes, etc.), a main memory 704 and a static memory 706, which communicate with each other via a link 708 (e.g., bus). The computer system 700 may further include a video display unit 710, an alphanumeric input device 712 (e.g., a keyboard), and a user interface (UI) navigation device 714 (e.g., a mouse). In one embodiment, the video display unit 710, input device 712 and UI navigation device 714 are incorporated into a touch screen display. The computer system 700 may additionally include a storage device 716 (e.g., a drive unit), a signal generation device 718 (e.g., a speaker), a network interface device 720, and one or more sensors (not shown), such as a global positioning system (GPS) sensor, compass, accelerometer, or other sensor.

The storage device 716 includes a machine-readable medium 722 on which is stored one or more sets of data structures and instructions 724 (e.g., software) embodying or utilized by any one or more of the methodologies or functions described herein. The instructions 724 may also reside, completely or at least partially, within the main memory 704, static memory 706, and/or within the processor 702 during execution thereof by the computer system 700, with the main memory 704, static memory 706, and the processor 702 also constituting machine-readable media.

While the machine-readable medium 722 is illustrated in an example embodiment to be a single medium, the term "machine-readable medium" may include a single medium or multiple media (e.g., a centralized or distributed database, and/or associated caches and servers) that store the one or more instructions 724. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples:

Example 1 is a system of attention-based gesture recognition comprising: processing circuitry to: access an image of a user, the user proximate to a computing device; determine, based on the image, whether user is attentive to the computing device; and selectively enable or disable a function of the computing device depending on whether the user is attentive.

In Example 2, the subject matter of Example 1 includes, wherein to determine whether the user is attentive, the processing circuitry is to: determine a head pose of the user from the image; determine a direction angle of the head pose with respect to the computing device; and determine that the user is attentive based on a first threshold angle and a second threshold angle, wherein the first threshold angle is measured in a first direction with respect to the computing device, and the second threshold angle is measured in a second direction with respect to the computing device, the second direction opposite of the first direction, and wherein the user is determined to be attentive if the direction angle is between the first threshold angle and the second threshold angle.

In Example 3, the subject matter of Examples 1-2 includes, wherein to determine whether the user is attentive, the processing circuitry is to: determine a direction angle of eye gaze of the user, with respect to the computing device based on the image; and determine that the user is attentive based on a first threshold angle and a second threshold angle, wherein the first threshold angle is measured in a first direction with respect to the computing device, and the second threshold angle is measured in a second direction with respect to the computing device, the second direction opposite of the first direction, and wherein the user is determined to be attentive if the direction angle is between the first threshold angle and the second threshold angle.

In Example 4, the subject matter of Examples 2-3 includes, wherein the first and second thresholds angles are approximately 45° from a centerline, the centerline defined by a ray from the user to the computing device.

In Example 5, the subject matter of Examples 2-4 includes, wherein the first and second thresholds angles are different angles.

In Example 6, the subject matter of Examples 2-5 includes, wherein the first and second thresholds angles positive and negative vertical angles measured from a horizon, the horizon defined by a horizontal plane including a centerline from the user to the computing device.

In Example 7, the subject matter of Examples 1-6 includes, wherein the function of the computing device comprises gesture recognition, and wherein to selectively enable or disable the function of the computing device depending on whether the user is attentive, the processing circuitry is to: supply power to a gesture recognition circuitry when the user is attentive; and reduce power to the gesture recognition circuitry when the user is inattentive, the user considered inattentive when the direction angle of the head pose exceeds the first or second threshold angle.

In Example 8, the subject matter of Examples 1-7 includes, wherein the function of the computing device comprises audio processing, and wherein to selectively enable or disable the function of the computing device depending on whether the user is attentive, the processing circuitry is to: selectively configure a microphone array to track voice commands of the user based on head position of the user.

In Example 9, the subject matter of Examples 1-8 includes, wherein the function of the computing device comprises sound output, and wherein to selectively enable or disable the function of the computing device depending on whether the user is attentive, the processing circuitry is to: selectively configure a speaker array to provide an optimal soundstage based on head position of the user.

Example 10 is a method of attention-based gesture recognition comprising: accessing an image of a user, the user proximate to a computing device; determining, based on the image, whether user is attentive to the computing device; and selectively enabling or disabling a function of the computing device depending on whether the user is attentive.

In Example 11, the subject matter of Example 10 includes, wherein determining whether the user is attentive comprises: determining a head pose of the user from the image; determining a direction angle of the head pose with respect to the computing device; and determining that the user is attentive based on a first threshold angle and a second threshold angle, wherein the first threshold angle is measured in a first direction with respect to the computing device, and the second threshold angle is measured in a second direction with respect to the computing device, the second direction opposite of the first direction, and wherein the user is determined to be attentive if the direction angle is between the first threshold angle and the second threshold angle.

In Example 12, the subject matter of Examples 10-11 includes, wherein determining whether the user is attentive comprises: determining a direction angle of eye gaze of the user, with respect to the computing device based on the image; and determining that the user is attentive based on a first threshold angle and a second threshold angle, wherein the first threshold angle is measured in a first direction with respect to the computing device, and the second threshold angle is measured in a second direction with respect to the computing device, the second direction opposite of the first direction, and wherein the user is determined to be attentive if the direction angle is between the first threshold angle and the second threshold angle.

In Example 13, the subject matter of Examples 11-12 includes, wherein the first and second thresholds angles are approximately 45° from a centerline, the centerline defined by a ray from the user to the computing device.

In Example 14, the subject matter of Examples 11-13 includes, wherein the first and second thresholds angles are different angles.

In Example 15, the subject matter of Examples 11-14 includes, wherein the first and second thresholds angles positive and negative vertical angles measured from a horizon, the horizon defined by a horizontal plane including a centerline from the user to the computing device.

In Example 16, the subject matter of Examples 10-15 includes, wherein the function of the computing device comprises gesture recognition, and wherein selectively enabling or disabling the function of the computing device depending on whether the user is attentive comprises: supplying power to a gesture recognition circuitry when the user is attentive; and reducing power to the gesture recognition circuitry when the user is inattentive, the user considered inattentive when the direction angle of the head pose exceeds the first or second threshold angle.

In Example 17, the subject matter of Examples 10-16 includes, wherein the function of the computing device comprises audio processing, and wherein selectively enabling or disabling the function of the computing device depending on whether the user is attentive comprises: selectively configuring a microphone array to track voice commands of the user based on head position of the user.

In Example 18, the subject matter of Examples 10-17 includes, wherein the function of the computing device comprises sound output, and wherein selectively enabling or disabling the function of the computing device depending on whether the user is attentive comprises: selectively configuring a speaker array to provide an optimal soundstage based on head position of the user.

Example 19 is at least one machine-readable medium including instructions, which when executed by a machine, cause the machine to perform operations of any of the methods of Examples 10-18.

Example 20 is an apparatus comprising means for performing any of the methods of Examples 10-18.

Example 21 is an apparatus for attention-based gesture recognition comprising: means for accessing an image of a user, the user proximate to a computing device; means for determining, based on the image, whether user is attentive to the computing device; and means for selectively enabling or disabling a function of the computing device depending on whether the user is attentive.

In Example 22, the subject matter of Example 21 includes, wherein the means for determining whether the user is attentive comprise: means for determining a head pose of the user from the image; means for determining a direction angle of the head pose with respect to the computing device; and means for determining that the user is attentive based on a first threshold angle and a second threshold angle, wherein the first threshold angle is measured in a first direction with respect to the computing device, and the second threshold angle is measured in a second direction with respect to the computing device, the second direction opposite of the first direction, and wherein the user is determined to be attentive if the direction angle is between the first threshold angle and the second threshold angle.

In Example 23, the subject matter of Examples 21-22 includes, wherein the means for determining whether the user is attentive comprise: means for determining a direction angle of eye gaze of the user, with respect to the computing device based on the image; and means for determining that the user is attentive based on a first threshold angle and a second threshold angle, wherein the first threshold angle is measured in a first direction with respect to the computing device, and the second threshold angle is measured in a second direction with respect to the computing device, the second direction opposite of the first direction, and wherein the user is determined to be attentive if the direction angle is between the first threshold angle and the second threshold angle.

In Example 24, the subject matter of Examples 22-23 includes, wherein the first and second thresholds angles are approximately 45° from a centerline, the centerline defined by a ray from the user to the computing device.

In Example 25, the subject matter of Examples 22-24 includes, wherein the first and second thresholds angles are different angles.

In Example 26, the subject matter of Examples 22-25 includes, wherein the first and second thresholds angles positive and negative vertical angles measured from a horizon, the horizon defined by a horizontal plane including a centerline from the user to the computing device.

In Example 27, the subject matter of Examples 21-26 includes, wherein the function of the computing device comprises gesture recognition, and wherein the means for selectively enabling or disabling the function of the computing device depending on whether the user is attentive comprise: means for supplying power to a gesture recognition circuitry when the user is attentive; and means for reducing power to the gesture recognition circuitry when the user is inattentive, the user considered inattentive when the direction angle of the head pose exceeds the first or second threshold angle.

In Example 28, the subject matter of Examples 21-27 includes, wherein the function of the computing device comprises audio processing, and wherein the means for selectively enabling or disabling the function of the computing device depending on whether the user is attentive comprise: means for selectively configuring a microphone array to track voice commands of the user based on head position of the user.

In Example 29, the subject matter of Examples 21-28 includes, wherein the function of the computing device comprises sound output, and wherein the means for selectively enabling or disabling the function of the computing device depending on whether the user is attentive comprise: means for selectively configuring a speaker array to provide an optimal soundstage based on head position of the user.

Example 30 is at least one machine-readable medium including instructions for attention-based gesture recognition, which when executed by a machine, cause the machine to perform operations comprising: accessing an image of a user, the user proximate to a computing device; determining, based on the image, whether user is attentive to the computing device; and selectively enabling or disabling a function of the computing device depending on whether the user is attentive.

In Example 31, the subject matter of Example 30 includes, wherein determining whether the user is attentive comprises: determining a head pose of the user from the image; determining a direction angle of the head pose with respect to the computing device; and determining that the user is attentive based on a first threshold angle and a second threshold angle, wherein the first threshold angle is measured in a first direction with respect to the computing device, and the second threshold angle is measured in a second direction with respect to the computing device, the second direction opposite of the first direction, and wherein the user is determined to be attentive if the direction angle is between the first threshold angle and the second threshold angle.

In Example 32, the subject matter of Examples 30-31 includes, wherein determining whether the user is attentive comprises: determining a direction angle of eye gaze of the user, with respect to the computing device based on the image; and determining that the user is attentive based on a first threshold angle and a second threshold angle, wherein the first threshold angle is measured in a first direction with respect to the computing device, and the second threshold angle is measured in a second direction with respect to the computing device, the second direction opposite of the first direction, and wherein the user is determined to be attentive if the direction angle is between the first threshold angle and the second threshold angle.

In Example 33, the subject matter of Examples 31-32 includes, wherein the first and second thresholds angles are approximately 45° from a centerline, the centerline defined by a ray from the user to the computing device.

In Example 34, the subject matter of Examples 31-33 includes, wherein the first and second thresholds angles are different angles.

In Example 35, the subject matter of Examples 31-34 includes, wherein the first and second thresholds angles positive and negative vertical angles measured from a horizon, the horizon defined by a horizontal plane including a centerline from the user to the computing device.

In Example 36, the subject matter of Examples 30-35 includes, wherein the function of the computing device comprises gesture recognition, and wherein selectively enabling or disabling the function of the computing device depending on whether the user is attentive comprises: supplying power to a gesture recognition circuitry when the user is attentive; and reducing power to the gesture recognition circuitry when the user is inattentive, the user considered inattentive when the direction angle of the head pose exceeds the first or second threshold angle.

In Example 37, the subject matter of Examples 30-36 includes, wherein the function of the computing device comprises audio processing, and wherein selectively enabling or disabling the function of the computing device depending on whether the user is attentive comprises: selectively configuring a microphone array to track voice commands of the user based on head position of the user.

In Example 38, the subject matter of Examples 30-37 includes, wherein the function of the computing device comprises sound output, and wherein selectively enabling or disabling the function of the computing device depending on whether the user is attentive comprises: selectively configuring a speaker array to provide an optimal soundstage based on head position of the user.

Example 39 is at least one machine-readable medium including instructions that, when executed by processing circuitry, cause the processing circuitry to perform operations to implement of any of Examples 1-38.

Example 40 is an apparatus comprising means to implement of any of Examples 1-38.

Example 41 is a system to implement of any of Examples 1-38.

Example 42 is a method to implement of any of Examples 1-38.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system of attention-based gesture recognition comprising:
    processing circuitry to:
        access an image of a user;
        determine, based on the image, whether the user is attentive to a computing device; and
        selectively enable or disable a function of the computing device depending on whether the user is attentive, wherein to selectively enable or disable the function, includes at least one of:
        configuring a microphone array to track voice commands of the user based on a head position of the user, wherein the microphone array includes a near-field microphone and a far-field microphone, wherein the microphone array is configured to use the near-field microphone or the far-field microphone based on the head position of the user; or
        configuring a speaker array to provide an improved soundstage based on the head position of the user, wherein the speaker array includes an audio beamforming configuration and a far-field configuration, wherein the speaker array is configured to use the audio beamforming configuration or the far-field configuration based on the head position of the user.

2. The system of claim 1, wherein to determine whether the user is attentive, the processing circuitry is to:
    determine a head pose of the user from the image;
    determine a direction angle of the head pose with respect to the computing device; and
    determine that the user is attentive based on a first threshold angle and a second threshold angle, wherein the first threshold angle is measured in a first direction with respect to the computing device, and the second threshold angle is measured in a second direction with respect to the computing device, the second direction opposite of the first direction, and wherein the user is determined to be attentive if the direction angle is between the first threshold angle and the second threshold angle.

3. The system of claim 2, wherein the function of the computing device comprises gesture recognition, and wherein to selectively enable or disable the function of the computing device depending on whether the user is attentive, the processing circuitry is to:
    supply power to a gesture recognition circuitry when the user is attentive; and
    reduce power to the gesture recognition circuitry when the user is inattentive, the user considered inattentive when the direction angle of the head pose exceeds the first or second threshold angle.

4. The system of claim 1, wherein to determine whether the user is attentive, the processing circuitry is to:
    determine a direction angle of eye gaze of the user, with respect to the computing device based on the image; and
    determine that the user is attentive based on a first threshold angle and a second threshold angle, wherein the first threshold angle is measured in a first direction with respect to the computing device, and the second threshold angle is measured in a second direction with respect to the computing device, the second direction opposite of the first direction, and wherein the user is determined to be attentive if the direction angle is between the first threshold angle and the second threshold angle.

5. The system of claim 4, wherein the first and second threshold angles are approximately 45° from a centerline, the centerline defined by a ray from the user to the computing device.

6. The system of claim 4, wherein the first and second threshold angles are different angles.

7. The system of claim 4, wherein the first and second threshold angles are positive and negative vertical angles measured from a horizon, the horizon defined by a horizontal plane including a centerline from the user to the computing device.

8. The system of claim 1, wherein configuring the microphone array to track voice commands of the user based on the head position of the user comprises configuring the microphone array to use the near-field microphone when the head position of the user is past a first threshold angle and use the far-field microphone when the head position of the user is past a second threshold angle, the first and second threshold angles from a centerline, the centerline defined by a ray from the user to the computing device.

9. The system of claim 1, wherein configuring the speaker array to provide the improved soundstage based on the head position of the user comprises configuring the speaker array to use the audio beamforming configuration when the head position of the user is past a first threshold angle and use the far-field configuration when the head position of the user is past a second threshold angle, the first and second threshold angles from a centerline, the centerline defined by a ray from the user to the computing device.

10. A method of attention-based gesture recognition comprising:
accessing an image of a user;
determining, based on the image, whether the user is attentive to a computing device; and
selectively enabling or disabling a function of the computing device depending on whether the user is attentive by performing at least one of:
configuring a microphone array to track voice commands of the user based on a head position of the user, wherein the microphone array includes a near-field microphone and a far-field microphone, wherein the microphone array is configured to use the near-field microphone or the far-field microphone based on the head position of the user; or
configuring a speaker array to provide an improved soundstage based on the head position of the user, wherein the speaker array includes an audio beamforming configuration and a far-field configuration, wherein the speaker array is configured to use the audio beamforming configuration or the far-field configuration based on the head position of the user.

11. The method of claim 10, wherein determining whether the user is attentive comprises:
determining a head pose of the user from the image;
determining a direction angle of the head pose with respect to the computing device; and
determining that the user is attentive based on a first threshold angle and a second threshold angle, wherein the first threshold angle is measured in a first direction with respect to the computing device, and the second threshold angle is measured in a second direction with respect to the computing device, the second direction opposite of the first direction, and wherein the user is determined to be attentive if the direction angle is between the first threshold angle and the second threshold angle.

12. The method of claim 11, wherein the function of the computing device comprises gesture recognition, and wherein selectively enabling or disabling the function of the computing device depending on whether the user is attentive comprises:
supplying power to a gesture recognition circuitry when the user is attentive; and
reducing power to the gesture recognition circuitry when the user is inattentive, the user considered inattentive when the direction angle of the head pose exceeds the first or second threshold angle.

13. The method of claim 10, wherein determining whether the user is attentive comprises:
determining a direction angle of eye gaze of the user, with respect to the computing device based on the image; and
determining that the user is attentive based on a first threshold angle and a second threshold angle, wherein the first threshold angle is measured in a first direction with respect to the computing device, and the second threshold angle is measured in a second direction with respect to the computing device, the second direction opposite of the first direction, and wherein the user is determined to be attentive if the direction angle is between the first threshold angle and the second threshold angle.

14. The method of claim 13, wherein the first and second threshold angles are approximately 45° from a centerline, the centerline defined by a ray from the user to the computing device.

15. The method of claim 13, wherein the first and second threshold angles are different angles.

16. The method of claim 13, wherein the first and second threshold angles are positive and negative vertical angles measured from a horizon, the horizon defined by a horizontal plane including a centerline from the user to the computing device.

17. At least one non-transitory machine-readable medium including instructions for attention-based gesture recognition, which when executed by a machine, cause the machine to perform operations comprising:
accessing an image of a user;
determining, based on the image, whether the user is attentive to a computing device; and
selectively enabling or disabling a function of the computing device depending on whether the user is attentive by performing at least one of:
configuring a microphone array to track voice commands of the user based on a head position of the user, wherein the microphone array includes a near-field microphone and a far-field microphone, wherein the microphone array is configured to use the near-field microphone or the far-field microphone based on the head position of the user; or
configuring a speaker array to provide an improved soundstage based on the head position of the user, wherein the speaker array includes an audio beamforming configuration and a far-field configuration, wherein the speaker array is configured to use the audio beamforming configuration or the far-field configuration based on the head position of the user.

18. The at least one non-transitory machine-readable medium of claim 17, wherein the function of the computing device comprises gesture recognition, and wherein selectively enabling or disabling the function of the computing device depending on whether the user is attentive comprises:
   determining a head pose of the user from the image;
   determining a direction angle of the head pose with respect to the computing device;
   determining that the user is attentive based on a first threshold angle and a second threshold angle, wherein the first threshold angle is measured in a first direction with respect to the computing device, and the second threshold angle is measured in a second direction with respect to the computing device, the second direction opposite of the first direction, and wherein the user is determined to be attentive if the direction angle is between the first threshold angle and the second threshold angle;
   supplying power to a gesture recognition circuitry when the user is attentive; and
   reducing power to the gesture recognition circuitry when the user is inattentive, the user considered inattentive when the direction angle of the head pose exceeds the first or second threshold angle.

\* \* \* \* \*